H. F. SCHMIDT.
OYSTER OPENER.
APPLICATION FILED FEB. 3, 1913.
1,071,352.
Patented Aug. 26, 1913.
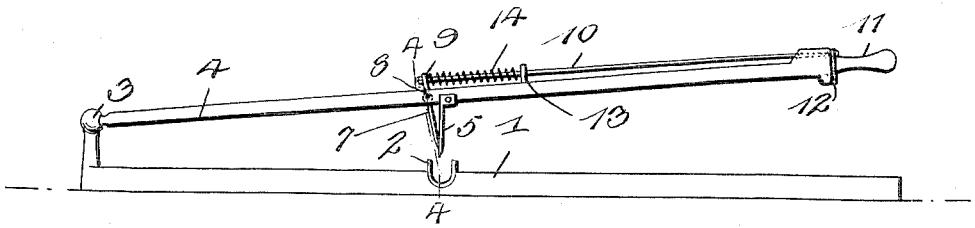
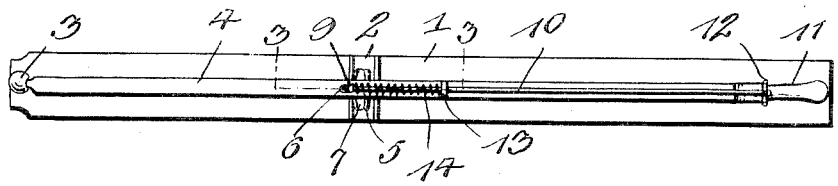
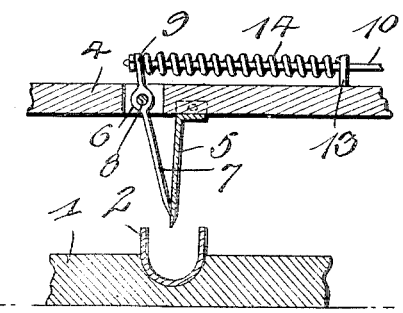 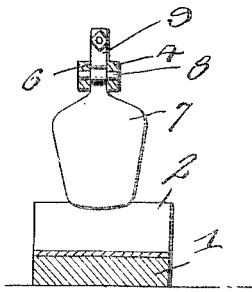
Inventor
H. F. Schmidt.
Witnesses
By Watson E. Coleman,
Attorney

UNITED STATES PATENT OFFICE.

HEINRICH FRITZ SCHMIDT, OF ANGLETON, TEXAS.

OYSTER-OPENER.

1,071,352.  Specification of Letters Patent.  Patented Aug. 26, 1913.

Application filed February 3, 1913. Serial No. 746,014.

*To all whom it may concern:*

Be it known that I, HEINRICH FRITZ SCHMIDT, a citizen of the United States, residing at Angleton, in the county of Brazoria and State of Texas, have invented certain new and useful Improvements in Oyster-Openers, of which the following is a specification, reference being had to the accompanying drawings.

This invention relates to improvements in oyster openers and an object thereof is the provision of a device of this character, in which the shell of the oyster is opened, and the oyster cut from the shell in one operation of the device.

A further object of this invention is the provision of an oyster opening apparatus which comprises a base plate having a lever mounted thereon, a pivoted knife mounted on said lever, and the lever being secured to the base plate by a universal joint, whereby the lever may be moved vertically for opening the shell and moved laterally for cutting the oyster from the shell.

A still further object of the invention is the provision of an oyster opener comprising a base plate and a lever pivotally mounted thereon, the lever being adapted to support a fixed knife for cutting the hinge of the oyster and also being adapted to support a pivoted knife for spreading the shells of the oyster.

With these and other objects in view, my invention resides in the novel constructions and arrangements of parts, to be hereinafter more fully described, claimed and illustrated in the accompanying drawing, in which—

Figure 1 is a side elevation of my device; Fig. 2 is a top plan view thereof; Fig. 3 is a section taken on the line 3—3 of Fig. 2, and Fig. 4 is a section taken on the line 4—4 of Fig. 1.

Referring more particularly to the drawing, the numeral 1 designates a preferably rectangular base plate, on which is mounted intermediate of its ends, a transversely extending box 2 which is adapted to receive the edge of the oyster opposite its hinge and maintain the oyster in a position for the operation of the knives. An angular universal bearing 3 is secured to one end of the base plate and connected at one end to the bearing, is a longitudinally extending lever 4. A knife blade 5 is rigidly connected to the lever intermediate of its ends and in alinement with the box 2 in the base plate and an opening 6 is formed in the lever adjacent the knife 5, in which is pivotally mounted a knife blade 7 on a spindle 8 which is secured in the opposite walls of the opening. A lever 9 is connected to the upper end of the knife 7, and connected to the upper end of the lever is a connecting rod 10 which extends rearwardly to the end of the lever. Connected to the opposite end of the rod 10 is a handle 11 which is hingedly connected as at 12 to the lever 4. An apertured bearing plate 13 is secured to the upper face of the lever 4, the aperture therein being adapted to receive the connecting rod 10 and a coil spring 14 is wound around said connecting rod between the lever 9 and the bearing plate 13 for maintaining the knife 7 in engagement with the knife 5.

The operation of my device is as follows: In the practical use thereof, the oyster is placed in the box 2 in the base plate, so that the hinge of the oyster will extend upwardly out of the box, whereupon the lever 4 is forced downwardly so that the rigidly connected knife 5 of the lever will split the hinge of the oyster. The handle 11 is thereupon moved downwardly, which operation will draw the connecting rod 10 rearwardly and actuate the pivoted knife 7 so that the shells of the oyster will be forced apart. A further downward movement of the lever 4 will move the knife 7 downwardly along the inner wall of one of the shells of the oyster and thereby sever the oyster from the shell. If, when the lever 4 is being moved downwardly for severing the oyster from the shell, the lever is also moved transversely, it will be seen that a slicing movement is given to the knife whereby the oyster will be sliced cleanly from the shell. It is apparent that the universal joint between the bearing 3 and the lever 4 allows this transverse movement of the lever coincident with the vertical movement thereof and this construction provides means whereby the shells are parted and the oyster is cut cleanly from the shell by one operation of the lever.

From the above description, taken in connection with the accompanying drawing, it will be seen that I have provided an oyster opener which is simple in construction, which may be cheaply manufactured and which will fulfil all of the requirements of such device.

While the form of the device illustrated in the accompanying drawing is the preferred embodiment of my invention, it will be understood that minor changes in construction may be made without departing from the spirit of my invention or sacrificing any of its advantages as determined by the appended claims.

Having thus fully described my invention what I desire to secure by Letters Patent is:

1. A device of the character described, comprising a base plate, a lever swivelly mounted upon said base plate, a knife rigidly secured to said lever, a second knife pivotally secured to said lever and adapted to engage the first mentioned knife, and means for actuating the pivotally connected knife, as and for the purpose described.

2. A device of the character described comprising a base plate, a transversely extending box secured to said base plate intermediate of its ends, a lever loosely mounted upon said base plate at one end thereof, and a transversely extending knife carried by said lever in alinement with said box, said knife being adapted for longitudinal movement within said box, as and for the purpose described.

3. A device of the character described comprising a base plate, a lever swivelly mounted upon said base plate at one end thereof, a knife secured to said lever intermediate of its ends, a transversely extending box secured to said base plate in alinement with said knife, a second knife pivotally connected to said lever and adapted to bear against said first mentioned knife, means for operating said pivotally connected knife, said knife being adapted for longitudinal movement with relation to said box, as and for the purpose described.

4. A device of the character described, comprising a base plate, a lever pivotally connected at one end to said base plate, a knife rigidly secured to said lever, a second knife pivotally connected to said lever and adapted to bear against the first mentioned knife, a handle hingedly connected to the opposite end of said lever, a rod connecting said handle and said pivotally mounted knife, and means for maintaining said pivotally mounted knife in engagement with said rigidly mounted knife.

5. A device of the character described comprising a base plate, a lever pivotally connected at one end to said base plate, a knife secured to and depending from the under face of said lever, a second knife pivotally mounted in said lever and adapted to bear against said first mentioned knife, said pivotally mounted knife extending above the upper face of said lever, a handle hingedly connected to the opposite end of said lever, a rod connecting said handle and the upwardly projecting portion of said pivotally mounted knife, and means adapted to bear against the upwardly extending portion of said pivotally mounted knife for maintaining the same in engagement with said rigidly mounted knife, as and for the purpose described.

6. A device of the character described comprising a base plate, a lever swivelly connected at one end to said base plate, a knife rigidly secured to said lever, a second knife pivotally connected to said lever and adapted to bear against the first mentioned knife, a transversely extending box secured to said base plate in vertical alinement with said knives, a handle hingedly connected to the opposite end of said lever, a rod connecting said handle and said pivotally mounted knife, said knives being adapted for longitudinal movement with relation to said box, as and for the purpose described.

In testimony whereof I hereunto affix my signature in the presence of two witnesses.

HEINRICH FRITZ SCHMIDT.

Witnesses:
A. E. MASTERSON,
F. M. HARVIN.